Jan. 25, 1949.   J. G. TRUMP ET AL   2,460,201
LAMINATED ENVELOPE STRUCTURE FOR
ELECTRON DISCHARGE DEVICES
Filed Dec. 20, 1946   2 Sheets-Sheet 1
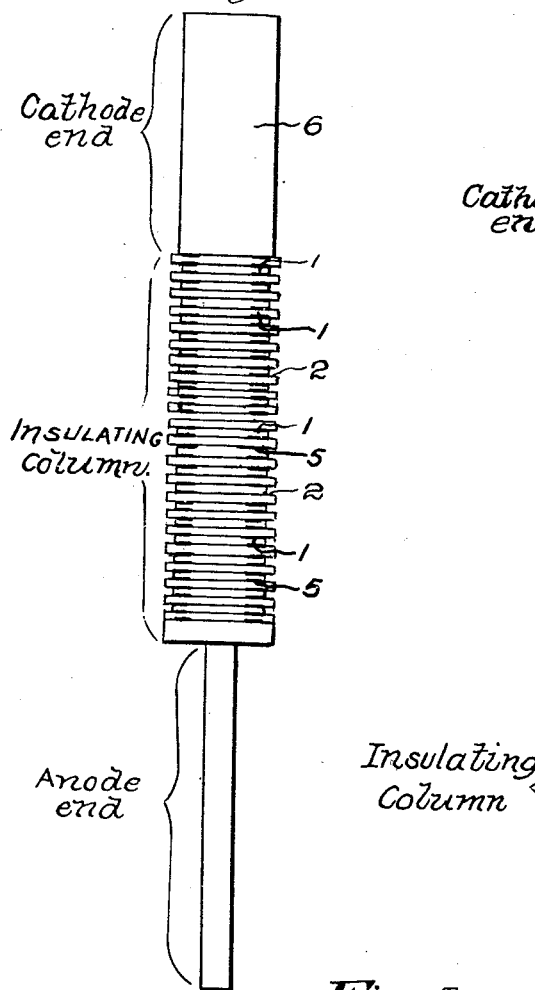
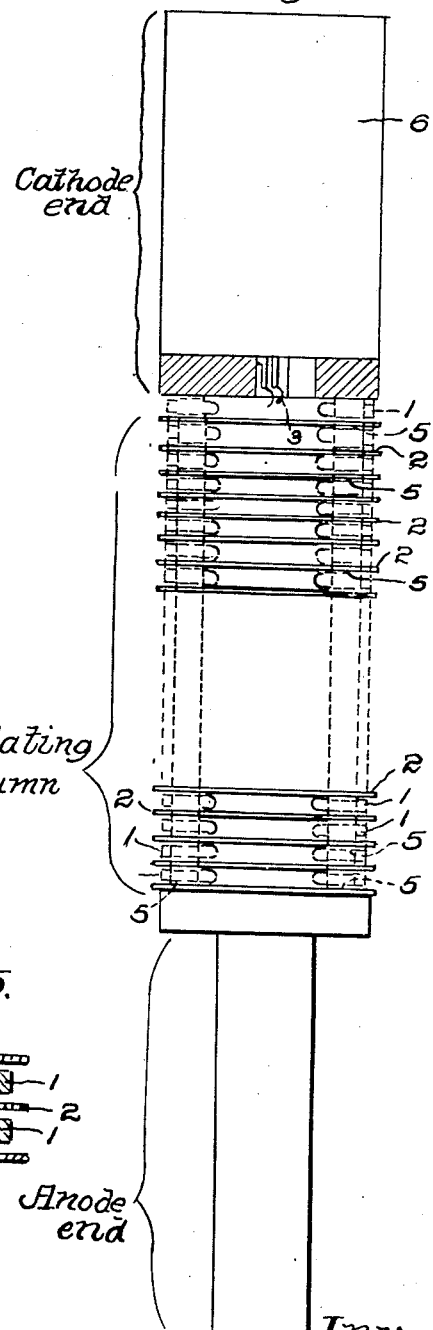
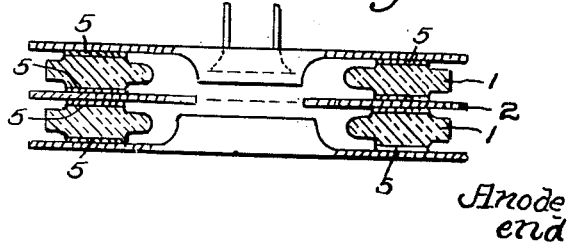
Inventors
John G. Trump.
Robert W. Cloud Jan. 25, 1949.　　J. G. TRUMP ET AL　　2,460,201
LAMINATED ENVELOPE STRUCTURE FOR
ELECTRON DISCHARGE DEVICES
Filed Dec. 20, 1946　　　　　　　　　　　　2 Sheets-Sheet 2
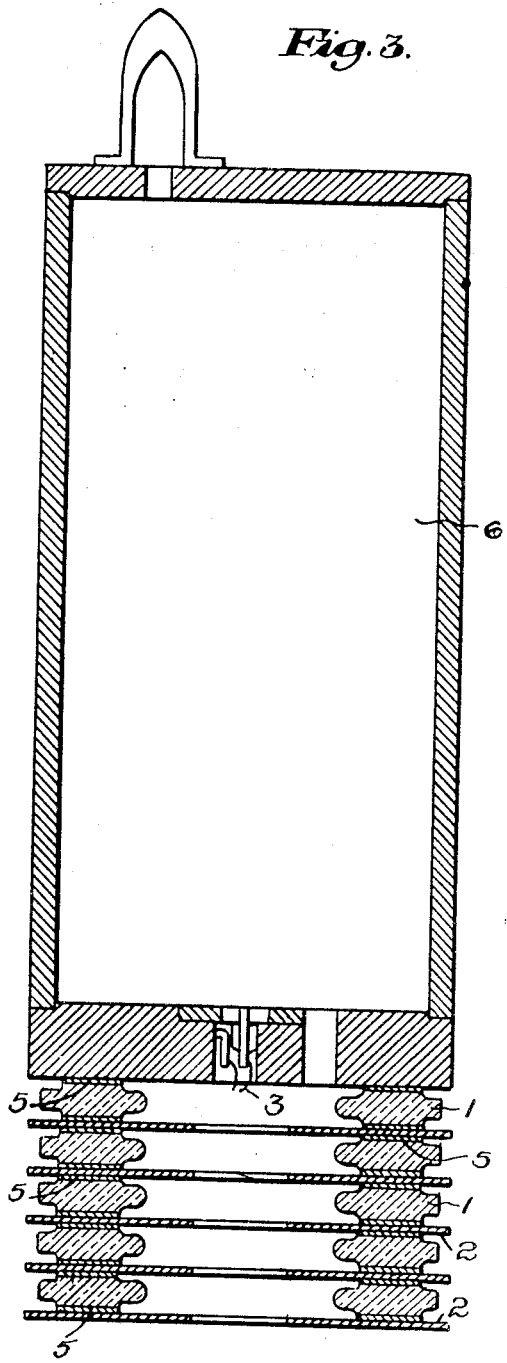
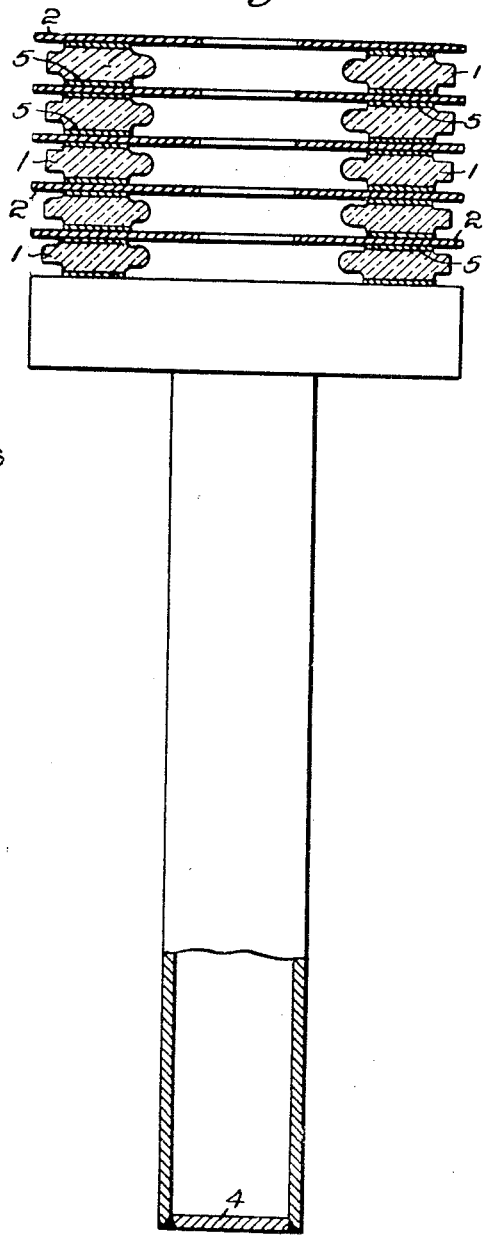
Inventors:
John G. Trump.
Robert W. Cloud.

Patented Jan. 25, 1949

2,460,201

UNITED STATES PATENT OFFICE 2,460,201

LAMINATED ENVELOPE STRUCTURE FOR ELECTRON DISCHARGE DEVICES

John G. Trump, Winchester, and Robert W. Cloud, Lexington, Mass., assignors to Research Corporation, New York, N. Y., a corporation of New York Application December 20, 1946, Serial No. 717,380

11 Claims. (Cl. 250—27.5)

This invention particularly relates to sealed-off, high-voltage, acceleration tubes of unusual voltage strength and compactness, but is not restricted thereto since the plastic seal technique herein set forth is useful also in continuously pumped tubes, and moreover is applicable to other types of electronic tubes.

In order that the broad principle of the invention may be readily understood, we have in the accompanying drawings, disclosed two embodiments or representations of an article or apparatus indicative of such portion of the invention, and we shall in the ensuing specification, describe merely such preferred embodiments of the novel acceleration tube, without limiting ourselves to such type of tube. We shall also herein set forth the best mode known to us for constructing the same, and in so doing shall point out wherein our electronic tube and specifically our acceleration tube are distinguished from and present an important advance over the prior art.

In the United States patent to Machlett & Skehan, No. 2,376,439, dated May 22, 1945, there is disclosed an evacuated electric discharge device or acceleration tube made up of a series of similar annular metallic disks or rings and annular sections of glass sealed to opposite faces of the respective disks, each such glass section joining a pair of metallic disks together and insulating them from one another, but it was necessary, prior to our invention, in constructing such an acceleration tube or other electronic tubes to make the said disks of a metal of approximately the same coefficient of expansion as the glass sections, because of the fact that the metallic disks and the glass sections were heated to a temperature required to effect the seals, the surfaces of each metallic disk in contact with glass sections becoming oxidized in effecting the seals. In the said prior practice, the surfaces of each metallic disk became oxidized, and as the glass sections softened and became plastic, the parts assumed their desired final spaced relation. In such operation the glass sections were likely to be somewhat deformed.

In such former practice of making acceleration tubes, or other types of electronic tubes, when the first end cap thereof was secured to the first metallic disk by the sealing of the first glass section to the said parts, another glass section and then another metallic disk were placed in position and the glass section was sealed in the same manner to the two metallic disks. These operations were then repeated until a series of metallic disks and glass sections of the desired length had been completed, after which the other end cap was sealed to the last glass section of the tube. Thereafter the acceleration tube, or other type of electronic tube, was subjected to the usual processing operations to evacuate it and prepare it for use.

The said glass sections might be made of borosilicate glass and in such case the metallic sections were made of an alloy of nickel, iron and cobalt.

In such process of the prior art, and referring particularly to acceleration tubes, the parts were made of such gauge that the metallic disks, but for the provision of circumferentially distorted stiffening portions at the outer edge thereof, would be subjected to warping when heated to the temperature required to effect the seal. The distortion or shaping of the metallic disks, which has been found necessary in the prior art to prevent excessive warping when subject to the high temperatures of the sealing operation, invariably impairs the electrical performances of the assembly since it results in regions where the electrical stress is increased because of the sharp radii of curvature or because of a reduction in the minimum separation between the disks. In this manner, as many as 172 metallic disks separated by insulating glass sections were built up into a tube having an over-all length of about 57 inches. The said metallic disks were provided with parallel portions lying inward of the glass sections. Such electric discharge devices or acceleration tubes as disclosed in the Machlett & Skehan patent were provided at their opposite ends with an anode and a cathode.

In constructing an acceleration tube or other type of electronic tube in accordance with our invention, a series of alternating metallic disks and annular members of glass or other suitable insulating material is provided, but in order to join such alternating metallic disks and alternating insulating members, we employ a thermoplastic or thermosetting film which desirably is a synthetic resin more specifically described herein as a modified vinyl acetate. Such film constitutes the vacuum sealing and mechanical bond between the alternating insulating rings of glass or other suitable material, and the metallic disks or rings of which a high-voltage acceleration tube or other type of electronic tube is composed. The proper choice and use of such bonding material makes possible the easy assembly of the complex structure of the acceleration tube, or other type of electronic tube, with complete freedom in the choice of the materials for both the insulating and the metallic members, which was not possible in the prior practices, and at the same time permits the maintenance of high vacuum conditions without continuous pumping and with the insulation of exceedingly high-voltage gradients along the length of the accelerator column. However, the invention is also applicable to continuously pumped tubes of the acceleration or other type. The result is not only an acceleration tube which is self-supporting from a mechanical point of view, which is sealed off from pumps, and which can insulate the highest gradients along its length, but also in a broader sense is an electronic tube, either of the acceleration type or of other electronic type, and either sealed off or continuously pumped.

In the longest insulation tubes of the prior art, such as made in accordance with the disclosure of the said Machlett & Skehan patent, metallic disks comprising a metallic alloy of nickel, iron and cobalt were employed, and glass sections of carefully selected composition were chosen that conformed in their thermal-expansion characteristics so completely that a vacuum-tight glass-to-metal seal was made at the softening temperature of the glass. In such process the conventional technique of glass-to-metal seals was employed. Such prior practices imposed several serious limitations which restricted the development of high-voltage acceleration tubes and associated high-voltage equipment and which limitations led to the development of our invention.

Conventional glass-to-metal sealing is a difficult technique, particularly when a large number of glass-to-metal seals of large diameter are required per unit length of column. The necessity for similar expansion characteristics between metal and glass also greatly restricted the choice of the insulating material. Our researches have shown that the insulating material plays a decisive role in the voltage-insulating strength of the assembled stack of metallic rings and insulating members which make up the insulating column of the acceleration or other type of electronic tube. Moreover, the difficulties of fusing together metals and glass under high temperatures place a limitation on the thickness of the glass wall, which in turn enhances the possibility of wall puncture if thin glass walls are used. Finally, such described method of the prior art of joining glass and metal restricts the possibility of contouring the inner wall of the glass insulator, a procedure which is effective in increasing the flash-over strength.

These facts have led to the development of our invention and its resulting novel electronic tube of the acceleration or other type.

The utilization of a plastic bond between the glass sections and the metallic disks of an acceleration or other type of electronic tube constitutes a technique which can be carried out with less elaborate apparatus and with resultant greater control than was possible with the practices of the prior are. We have by our invention made wholly satisfactory bonds between metallic disks or members and a wide variety of insulating materials for the insulation sections, including porcelain and glasses. Such bond in the practice of the herein disclosed invention has shown mechanical strength in tension of over 2000 pounds per square inch, and the resulting insulation tubes are completely vacuum-tight even when surrounded by gas pressure at many atmospheres.

The invention will be better understood in detail by reference to the following description when taken in connection with the accompanying illustration of two specific embodiments thereof, while the scope of the invention will be more particularly pointed out in the appended claims.

In the drawings:

Fig. 1 is a side elevation, partly broken away at an intermediate part of its length, of an evacuated, electric discharge device or acceleration tube made up, in accordance with our invention, of a large number of alternating metallic disks or rings and annular sections of insulation material, the abutting surfaces whereof are all bonded together by plastic material to constitute plastic sealing;

Fig. 2 is a side elevation, partly in section, of a similar acceleration tube, the intermediate portion whereof is broken away in order that other parts of the said tube may be indicated upon a somewhat larger scale.

Fig. 3 is a vertical central section of the upper portion of the acceleration tube shown in Fig. 1, but upon a much larger scale, so that the films of plastic material between all abutting surfaces may be more readily apparent, portions of the internal structure of the said tube being omitted because not necessary to an understanding of our invention;

Fig. 4 is a vertical central section similar to Fig. 3, but of the lower part of the said acceleration tube, portions of the internal structure of the said tube being omitted because not necessary to an understanding of our invention; and Fig. 5 is a vertical, central, cross sectional view of a three-element electronic tube in which the insulation and conducting elements are joined by means of a plastic seal at all abutting surfaces.

Referring to the drawings illustrating two embodiments constituting the article or apparatus of the invention, there is shown in Figs. 1, 2, 3 and 4 the assembly of a sealed-off two-million-volt acceleration tube, which utilizes throughout the herein disclosed plastic vacuum-tight seal to join the metal and the glass or insulation parts or members, and the metal-to-metal parts or members, and which is, therefore, illustrative of our invention.

In Fig. 1 is illustrated such a sealed-off two-million volt X-ray tube assembly (but with an intermediate portion broken away) which in practice is mounted within a high-voltage generator in such a way that the cathode end is within the high-voltage terminal and the tube column is within the column of the generator itself.

In Fig. 5, as a second embodiment of the article of our invention, is shown a three-element tube in which the insulating and conducting elements, parts or members are joined by a plastic seal of the character herein disclosed.

In Figs. 1, 2, 3 and 4 is shown a high-voltage vacuum tube consisting of a column composed of a large number of alternating glass or other insulation rings and metal electrode rings or ring-like diaphragms or disks bonded together in the manner herein described.

In Figs. 1, 2, 3 and 4 the glass or other insulation rings are respectively indicated at 1 and the metal electrode rings, centrally-open diaphragms or disks at 2. The said metal rings, diaphragms or disks 2 lie accurately placed in planes perpendicular to the axis of the tube and are placed at equal distances apart, as, for example, one-third of an inch. In Figs. 3 and 4 the upper and the lower end portions of the tube or column are represented, but broken away because of drafting limitations. In Figs. 1 and 2 the acceleration tube as a whole is represented, but with the intermediate portion broken away, it having in this instance an over-all length of about four feet, and an outside diameter of about three inches, the diameter of the opening of each metal ring 2 being about one inch. The total length of the portion of the tube that is composed of the said glass or other insulation rings 1 and metal rings 2 is in the present example about twenty-four inches. The scope of the invention is in no wise restricted by this recitation of dimensions and, as stated, in Fig. 5 is represented a three-element tube embodying the article constituting the invention herein claimed, the elements being correspondingly numbered.

Inasmuch as the invention is concerned with the bonding together by a plastic film, as herein disclosed, of the column of alternating glass or other insulation rings and metallic rings, it is unnecessary to disclose in detail or to describe the other parts of the acceleration tube. It is sufficient for the purpose to state that within the upper or cathode end of the tube above or in the horizontal plane of the uppermost metallic ring 2 is positioned the filament or electron emitter 3 from which emanates the electron beam and which may be composed of tungsten. The cathode assembly 6 also contains the charcoal and getter material for the absorption of residual gases. Where the apparatus is used for generating X-rays, as for high-voltage radiography, the electron beam is focused on a target 4, preferably of gold, at the lower or anode end of the tube.

In each of Figs. 1, 2, 3, 4 and 5, the film of plastic material, which is preferably Vinylseal T-24-9 and is therefore synthetic resin, is represented or indicated by a line 5, but not necessarily in exact relative proportions or thickness with respect to the thickness of the glass or other insulation rings and the metal rings. With respect to the thickness of the plastic film, it is preferably thin and may well be as little as 0.0005 inch in a practical application. Such film or bond is positioned preferably in the manner herein described between all the abutting surfaces of the tube—that is, not only between all the alternating glass or insulation rings and the metal rings, but also between the uppermost metal ring and the lower edge of the cathode end 6 of the acceleration tube, wherein is the getter chamber, and also at the under surface of the lowermost glass or insulation ring at the anode end of the acceleration tube, to bond all parts of the acceleration tube by such plastic bond or seal.

In the practice of our invention the thickness of the glass wall of each section of the acceleration or other type of electronic tube can be of any desired value and can readily be made sufficiently large so that puncture of the wall of the acceleration or other type of electronic tube by stray high energy electrons is improbable. Moreover when using glass for the insulating sections, the glass can be carefully selected for its ability to insulate high voltages in vacuum, this being the factor which, referring particularly to acceleration tubes, now limits the voltage gradient that can be applied to pressure-insulated tubes of that type. The herein disclosed method of joining electronic tube elements also permits the inside wall of each glass or porcelain section to be contoured or corrugated as desired to increase the flash-over strength in high vacuum, and permits the outside wall to be contoured to increase its flash-over strength in the gas or medium into which the acceleration tube is to be immersed.

In the practice of the herein disclosed invention, the procedure for assembling the parts of the acceleration or other type of electronic tube consists in coating the abutting glass (or porcelain) and the metallic surfaces with a layer of the said plastic bond, as shown or indicated at 5 in Figs. 3, 4 and 5. Such layer of the plastic bond is applied and conditioned before assembling and in such way as substantially to eliminate the solvents and the occluded gases. The components of the acceleration or other type of electronic tubes are, after the application of the plastic bond, then assembled accurately on a mandrel and are, while on the mandrel, heated under pressure until the plastic surfaces have united throughout the entire area. In this manner only a single heating of all the components of the acceleration or other type of electronic tube is necessary inasmuch as all such components are assembled on the mandrel before the application of heat under pressure.

In describing the method of constructing an electronic tube, whether of the acceleration or other type, we have stated that the abutting surfaces of the insulation sections and of the metallic members are coated with a layer of a plastic bond before such sections and members are assembled upon a mandrel. This is the preferred order of procedure, but our invention is not limited thereto, and we may if desired otherwise apply the layers of plastic bond. For example, we may prepare appropriately shaped ring-like films of plastic material as solid and separate units and place one such ring-like film between each two of the component insulating and conducting members which are to be joined together as these components are assembled on the mandrel. In such case the component parts including the metallic end caps, constituting the electronic tube, whether of the acceleration or other type, are then heated under pressure after having been brought into contact with each other on the mandrel.

With the accurate carrying out of the herein described method claimed in our co-pending divisional application, the resultant assembly is not only vacuum-tight, but it is capable of being out-gassed to a point where the acceleration or other type of electronic tube assembly can be sealed off and be operated for a long period of time at high voltages and with substantial beam currents. Before sealing off, the said assembly of components of the acceleration or other type of electronic tube is subjected to out-gassing and conditioning by the application of high voltage to each of the insulating sections, either separately or in series.

In a typical assembly procedure, in accordance with our invention, all insulating and metal components of the acceleration tube are carefully cleaned. This cleaning may be and desirably is accomplished with solvents or may be carried to the point of heating the individual components in vacuum. Those surfaces of the insulating and metal members which are to be joined are each covered with a measured amount of the plastic sealing material in solution applied in a uniform thin layer. These coatings are then permitted to air-dry after which they are heated to a temperature of 180° C. to drive off the solvents and other vapors. The components are then permitted to cool, which leaves the plastic film as a smooth, hard, non-tacky surface. Thereafter the components are assembled in proper order, using a carefully designed mandrel or assembly guide to insure perfect alignment. Spring pressure is applied between the extremities of this assembly which is placed in an oven and heated to 180° C. At this temperature the abutting surfaces, each coated with a film of the plastic material, unite to form a clear bubble-free vacuum-tight bond of high mechanical strength and durability. The final assembly of the entire tube may be and is accomplished in a single heating operation.

It was not anticipated nor even to our knowledge suggested by others skilled in the art that a plastic film could be used to provide a vacuum-tight mechanical bond between metal and insulating materials without at least seriously impairing the electrical performance of the tube because of the vapor pressure and decomposition products which might be given off by plastic material when subject to voltage and stray electronic bombardment. This quite reasonable belief or attitude has in fact caused the art to avoid the use of organic materials for any purpose within an evacuated tube, particularly where high voltages are involved. We have found, however, for the first time in the art, and have demonstrated by direct successful experiment that a plastic film does not measurably impair the electrical performance of high-voltage tubes of the broad type to which our invention relates. In fact, our studies of the performance of solid insulators in high vacuum using such films have resulted in several times higher gradients along the axial length of the tube than have ever been insulated before. For example, in a six-section tube employing a 96% silica glass called Vycor in annular rings between flat stainless-steel diaphragms, a voltage of 480,000 volts was insulated across a total tube length of 2¼ inches. Tests made by us with similar assemblies of the glass and metal disks, but in which the plastic was replaced by a lead gasket, showed similar but not better performance. In a larger sealed-off accelerator tube comprising an insulating column of sixty alternate silica glass sections and metal disks constructed in accordance with our invention, a voltage in excess of 2,000,000 volts was insulated by us. Nor can it be said that the plastic film as employed by us is not in an actively stressed region of the tube. On the contrary, it clearly exists in the most critical region in that the film is interposed between the metallic electrode and the main insulating region with its inner edge presented to the vacuum. Many other experiments have been devised by us which have shown that the electrical properties and the mechanical strength of these films remain unimpaired over long periods of time.

We have herein stated that in the practice of our invention we employ a thermoplastic film or a thermosetting film. Without thereby limiting our invention we state that we have had the best results in the practice of our invention with a thermoplastic, made by the Union Carbide & Carbon Company, and known as Vinylseal T-24-9, which is a modified vinyl acetate and is more broadly defined as a synthetic resin. We further state that the materials investigated by us in developing and perfecting our invention include shellac, clear glyptol, nylon, silicone resins, and a variety of plastic adhesives. We have found, in doing so, that it is necessary to choose a material which has an exceedingly low residual vapor pressure after it has been baked. This implies that, among other things, the solvents for the plastic must be capable of being driven off completely before the final assembly operation. We have also found, in developing and perfecting our invention, that many plastics are unsatisfactory because they do not leave a joint which is free from bubbles and other visual evidences of porosity. Moreover, certain materials, such as glyptol, are not of adequate mechanical strength and show a marked deterioration of mechanical strength with time and particularly with exposure to X radiation. Our said investigations and our research show that the general considerations, therefore, in the choice of a suitable adhesive, are that it have a low residual vapor pressure, that it form a seal which is free from bubbles and inhomogeneities, that it have a high mechanical strength in tension, and that it have high chemical stability in the presence of vacuum and in the presence of high electric stress and under electronic bombardment.

The substances referred to above, in so far as they have the characteristics just recited, fall within the scope of the present invention.

The result of our invention constitutes an important advance in the high-voltage acceleration tube art, as well as in the electronic tube art generally.

The selection of the plastic bond, the treatment thereof, both before and after assembly, and the conditioning of the acceleration or other type of electronic tube after assembly of the component elements thereof, all serve to reduce the vapor pressure of the sealing medium to a point where no difficulty leading to impaired high-voltage insulating strength has been found. In fact, referring particularly to acceleration tubes, to which our invention is in no wise restricted, higher voltage gradients have been insulated by acceleration tubes assembled as herein described than have as yet been produced when insulated by the methods of the prior art.

It has not heretofore been realized or anticipated by others that a complex acceleration tube assembly of glass (or porcelain) and metal, which utilizes a plastic sealing bond of high mechanical strength and which is subject in normal operation to high-voltage stress, could be successfully sealed-off and could maintain a high-vacuum insulating condition for long periods.

Referring again particularly to acceleration tubes as an example of the application and embodiment of our invention, an important procedure in sealing-off acceleration tubes made in accordance with the herein disclosed method claimed in our co-pending divisional application is the provision of adequate amounts of getter materials for the absorption of gases not otherwise removed in the assembly process. The plastic sealing materials with the best mechanical properties give off water and other vapors into the vacuum during the life of the tube. Also the use of plastic sealing materials does not generally lend itself to out-gassing the tube walls and electrodes by heating while on the pumps. A combination of activated charcoal and barium has been found most effective for removing these vapors and gases after the tube is sealed off, the charcoal being interposed between the barium and the body of the acceleration tube itself, all the getter material being kept in an inactive part of the acceleration tube. The charcoal is used in addition to the usual metallic getter film; for, while the charcoal is more effective in absorbing vapors, the metallic getter is necessary for absorbing the permanent gases. Other similar vapor absorbers—materials of large surface area because they are micro-porous, such as silica-jel and alundum—may be used in place of activated charcoal. The vapor absorber remains at room temperature during the life of the tube, but is prepared by heating in vacuum to drive out previously absorbed vapors, after which it is kept under vacuum until the tube is sealed from the pumps. Certain other metals have a high chemical affinity for gases and can be used in place of barium. Those in common use include calcium and zirconium.

The described sealing-off procedure or technique is applicable not only to acceleration tubes, but to other types of electronic tubes.

In the case of ultra-high frequency transmitter and receiver tubes, for example, this technique is important because it permits the selection of an insulating material of extremely low loss characteristics and enables insulating material to be joined to the metallic electrodes without consideration of their relative expansion coefficients. Moreover, in electronic tube applications where extremely high precision is required this technique can be used to advantage since all component parts may be formed accurately in advance and be joined together without the usual distortion which accompanies high-temperature sealing.

By the practice of our method there results an electronic tube, and particularly an acceleration tube, which is not only self-supporting from a mechanical point of view, but which is sealed-off from pumps and which can insulate the highest gradients along its length. It is evident from the foregoing disclosure that our invention is also applicable to continuously pumped tubes of the acceleration or other electronic type.

The acceleration tube herein disclosed and particularly referred to as a selected example of our invention, is an apparatus for generating an accurately focused beam of charged or swift particles, either electrons or ions. The means for providing a suitable source of high voltage for the operation of the acceleration tube is an electrostatic generator, such, for example, as disclosed in the United States patents to R. J. van de Graaff, No. 1,991,236, dated February 12, 1935, and No. 2,230,473, dated February 4, 1941. Such acceleration tube has electrodes adapted to be connected to the source of high potential. At one end of the acceleration tube, preferably the upper end, is located the means providing an emitting source such as a filament having a plane emitting surface of relatively minute area. The wall of the acceleration tube as constructed in accordance with the herein disclosed method comprises the metallic electrode rings or centrally open disks spaced by the glass or porcelain insulation sections. Such electrode rings or disks are connected in suitable manner to the corresponding electrode of a high-voltage generator in such a way that the potential gradient down the acceleration tube is uniform and also in such way that equal steps in the voltage between successive electrodes are provided. Thus the acceleration tube has a substantially uniform electrostatic field. By the use of a substantially uniform electrostatic field in combination with a magnetic lens in the high-voltage tube, extremely fine focusing is obtained of a high-speed electron beam of the order of as much as three million volts.

It will be understood that in the acceleration tube each successive electrode, metallic ring or member is more and more positive from the filament toward the target and that the electrons or negatively charged particles are attracted down the tube and strike the target with an energy corresponding to the full generator voltage. The focused spot upon the target may be exceedingly small, as, for example, less than 0.01 of an inch in diameter if a relatively weak magnetic field is used as a focusing lens.

Having thus described an electronic tube and our method of making the same, and particularly an acceleration tube and our method of making the same, and which disclosure constitutes two embodiments only of the broad invention, it is to be understood that although specific terms are employed, they are used in a generic and descriptive sense, and not for purposes of limitation, the scope of the invention being set forth in the following claims directed to sealed-off high-voltage electronic tubes, the herein disclosed method being claimed in a co-pending divisional application.

We claim:

1. A rigid, self-supporting, high-voltage, high-vacuum electronic device, capable of insulating the highest gradients along its length, the said device for that purpose comprising a multiplicity of metallic ring-like members and alternating insulating ring-like members constituting the insulating envelope, the abutting surfaces of all said members being bonded together by a plastic film, the said device, by reason of the bonding characteristics of said plastic film, being structurally rigid and structurally self-supporting mechanically, and the said bonding plastic film having low residual vapor pressure after baking, the said device also having throughout, by reason of said bonded plastic film, a vacuum-tight seal free from bubbles and inhomogeneities, the said bonded plastic film also having high chemical stability in the presence of vacuum and in the presence of high electric stress and under electronic bombardment, the said device being effectively sealed off by said plastic film bond, the said insulating members and metallic members of the device bonded by said plastic film having coefficients of expansion respectively indifferent to each other and permissibly differing, and the said plastic bond having itself a strength comparable to the intrinsic strength of the said metallic members and the said insulating members.

2. A rigid, self-supporting, high-voltage, high-vacuum electronic tube, capable of insulating the highest gradients along its length, the said tube for that purpose comprising a multiplicity of metallic ring-like members and alternating insulating ring-like members constituting the insulating envelope, the abutting surfaces of all said members being bonded together by a plastic film, the said tube by reason of the bonded characteristics of said plastic film being structurally rigid and structurally self-supporting mechanically, and the said bonding plastic film having low residual vapor pressure after baking, the said tube also having throughout, by reason of said bonded plastic film, a vacuum-tight seal free from bubbles and inhomogeneities, the said bonded plastic film also having high chemical stability in the presence of vacuum and in the presence of high electric stress and under electronic bombardment, the said tube being effectively sealed off by said plastic film bond, the said insulating members and metallic members of the tube bonded by said plastic film having coefficients of expansion respectively indifferent to each other and permissibly differing, and the said plastic bond having itself a strength comparable to the intrinsic strength of the said metallic members and the said insulating members, the said bonded electronic tube having at its respective ends cathode and anode assemblies likewise bonded by said plastic film to the insulating column at the respective abutting surfaces.

3. An electronic tube in accordance with claim 2, but wherein the said bonding film is a thermoplastic film.

4. An electronic tube in accordance with claim 2, but wherein the said bonding film is a thermosetting film.

5. An electronic tube in accordance with claim 2, but wherein the said bonding film is a resinous plastic film.

6. An electronic tube in accordance with claim 2, but wherein the said bonding film is a plastic film that is a synthetic resin.

7. An electronic tube in accordance with claim 2, but wherein the said tube is contoured on its inside to increase the flashover strength in high vacuum, and is contoured on the outside to increase the flashover strength in the media into which the said tube is to be immersed.

8. A sealed-off, high-vacuum, electronic device comprising alternating ring-like insulating members and metallic members, whereof the insulating members are chosen for their electrical properties and have a coefficient of expansion which may differ permissibly from the coefficient of expansion of the metallic members, the abutting surfaces of said member being bonded together by a vinyl acetate plastic film.

9. A rigid, self-supporting, high-voltage, high-vacuum, electronic device capable of insulating the highest gradients along its length, the said device for that purpose comprising a multiplicity of metallic ring-like members and alternating insulating ring-like members constituting the insulating envelope, the abutting surfaces of all said members being bonded together by a non-vitreous plastic film rendering the entire device structurally rigid and structurally self-supporting mechanically.

10. A sealed-off, high-vacuum electronic tube comprising alternating ring-like insulating members and metallic members, whereof the insulating members are chosen for their electrical properties and have a coefficient of expansion which may differ permissibly from the coefficient of expansion of the metallic members, the abutting surfaces of said members being bonded together by a vinyl-acetate plastic film, said electronic tube having at its respective ends cathode and anode assemblies bonded to the insulating column at the respective abutting surfaces by said film.

11. A sealed-off, self-supporting, high-voltage, high-vacuum, electronic device, the said device comprising insulating members with interposed metallic members constituting the separated and insulated electrodes, the abutting surfaces of which members are bonded together by a modified vinyl acetate plastic film.

JOHN G. TRUMP.
ROBERT W. CLOUD.

REFERENCES CITED

The following references are of record in the file of this patent:

UNITED STATES PATENTS

| Number | Name | Date |
| --- | --- | --- |
| 1,562,533 | Weintraub | Nov. 24, 1925 |
| 2,043,733 | Brasch et al. | June 9, 1936 |
| 2,376,439 | Machlett et al. | May 22, 1945 |
| 2,390,863 | Amidon | Dec. 11, 1945 |
| 2,412,302 | Spencer | Dec. 10, 1946 |